(12) United States Patent
Stabler

(10) Patent No.: US 11,839,959 B2
(45) Date of Patent: Dec. 12, 2023

(54) SELF-ADJUSTING CLAMP

(71) Applicant: Joshua Stabler, Merriam, KS (US)

(72) Inventor: Joshua Stabler, Fairway, KS (US)

(*) Notice: Subject to any disclaimer, the term of this patent is extended or adjusted under 35 U.S.C. 154(b) by 54 days.

(21) Appl. No.: 17/492,767

(22) Filed: Oct. 4, 2021

(65) Prior Publication Data

US 2023/0064118 A1    Mar. 2, 2023

Related U.S. Application Data

(60) Provisional application No. 63/239,511, filed on Sep. 1, 2021.

(51) Int. Cl.
  *B25B 5/02* (2006.01)
  *B25B 5/08* (2006.01)
  *F16M 13/02* (2006.01)
  *F16B 2/18* (2006.01)
  *F41G 11/00* (2006.01)

(52) U.S. Cl.
  CPC ............... *B25B 5/02* (2013.01); *B25B 5/08* (2013.01); *F16B 2/185* (2013.01); *F16M 13/02* (2013.01)

(58) Field of Classification Search
  CPC .. B25B 5/02; B25B 5/08; B25B 5/085; B25B 5/127; B25B 5/166; B25B 1/02; B25B 1/08; B25B 1/14; B25B 1/2489; B25B 1/06; F16M 13/02; F16M 11/041; F16B 2/185

USPC ............... 269/236, 227, 217, 202, 225, 226
See application file for complete search history.

(56) References Cited

U.S. PATENT DOCUMENTS 746,707 A * 12/1903 Joeklin ............. B23B 31/16083
                                                              269/227

FOREIGN PATENT DOCUMENTS

GB          2205056 A * 11/1988  ............... B25B 1/06

OTHER PUBLICATIONS

GB-2205056-A translation (Year: 1988).*

* cited by examiner

*Primary Examiner* — Tyrone V Hall, Jr.
*Assistant Examiner* — Abbie E Quann
(74) *Attorney, Agent, or Firm* — Buckley, Maschoff & Talwalkar LLC

(57) ABSTRACT

Provided is a clamp that can be attached to a tripod or other piece of equipment and which can hold rails for firearms, sights, scopes, parts, and the like, therein. The clamp is self-adjusting due to a compressible cam lever that enables an amount of give or play when clamping onto a rail or other object. The clamp also includes a scroll gear assembly that enables the compressible cam lever to drive opposing jaw plates toward and away from each other thereby clamping and releasing rails and other objects.

12 Claims, 10 Drawing Sheets

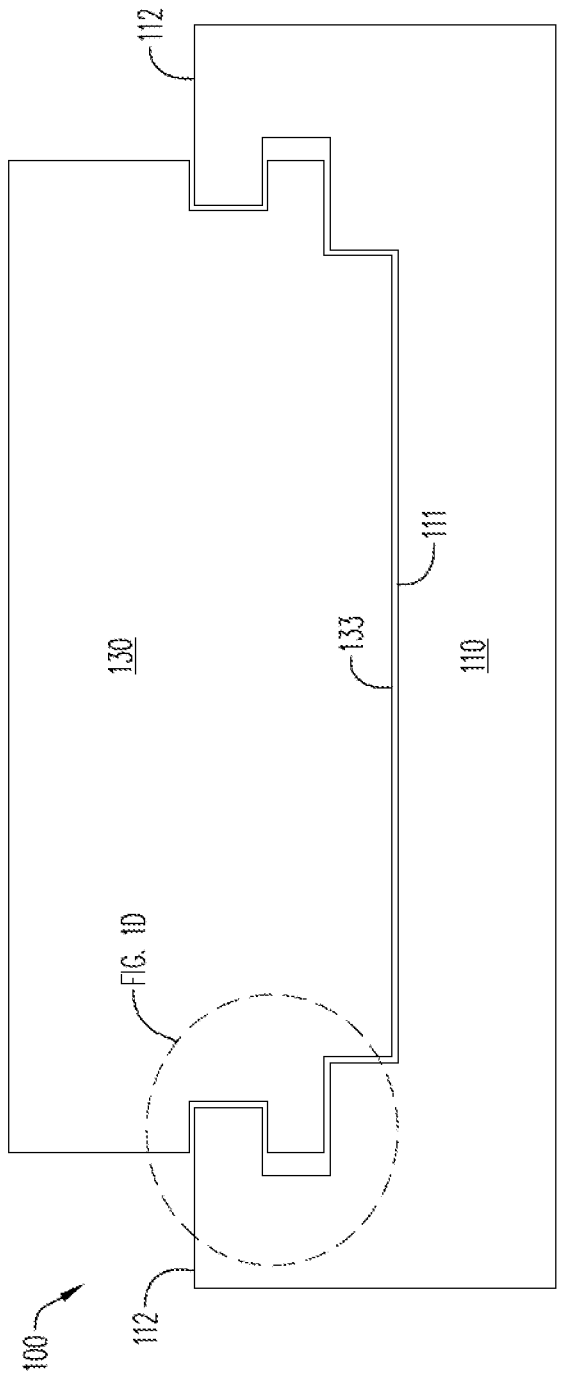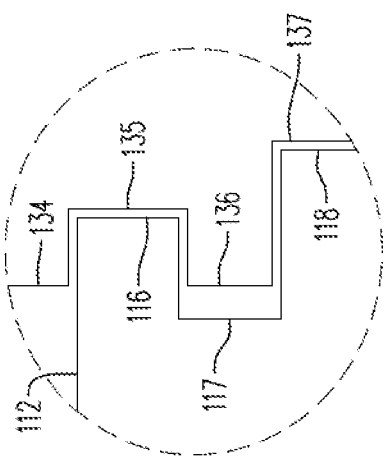

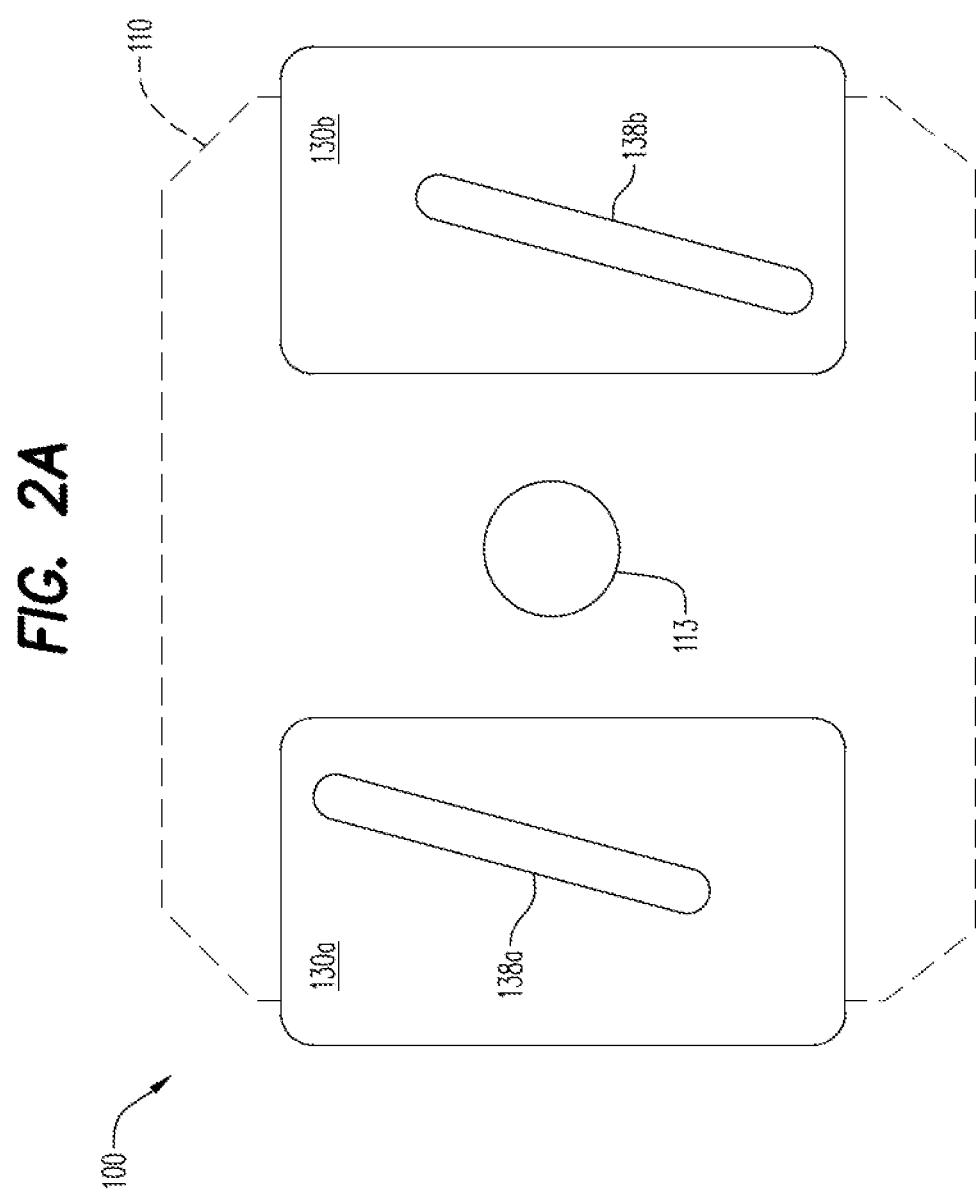

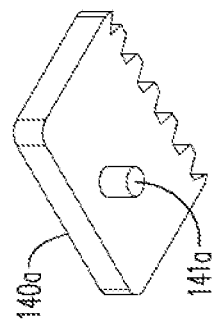
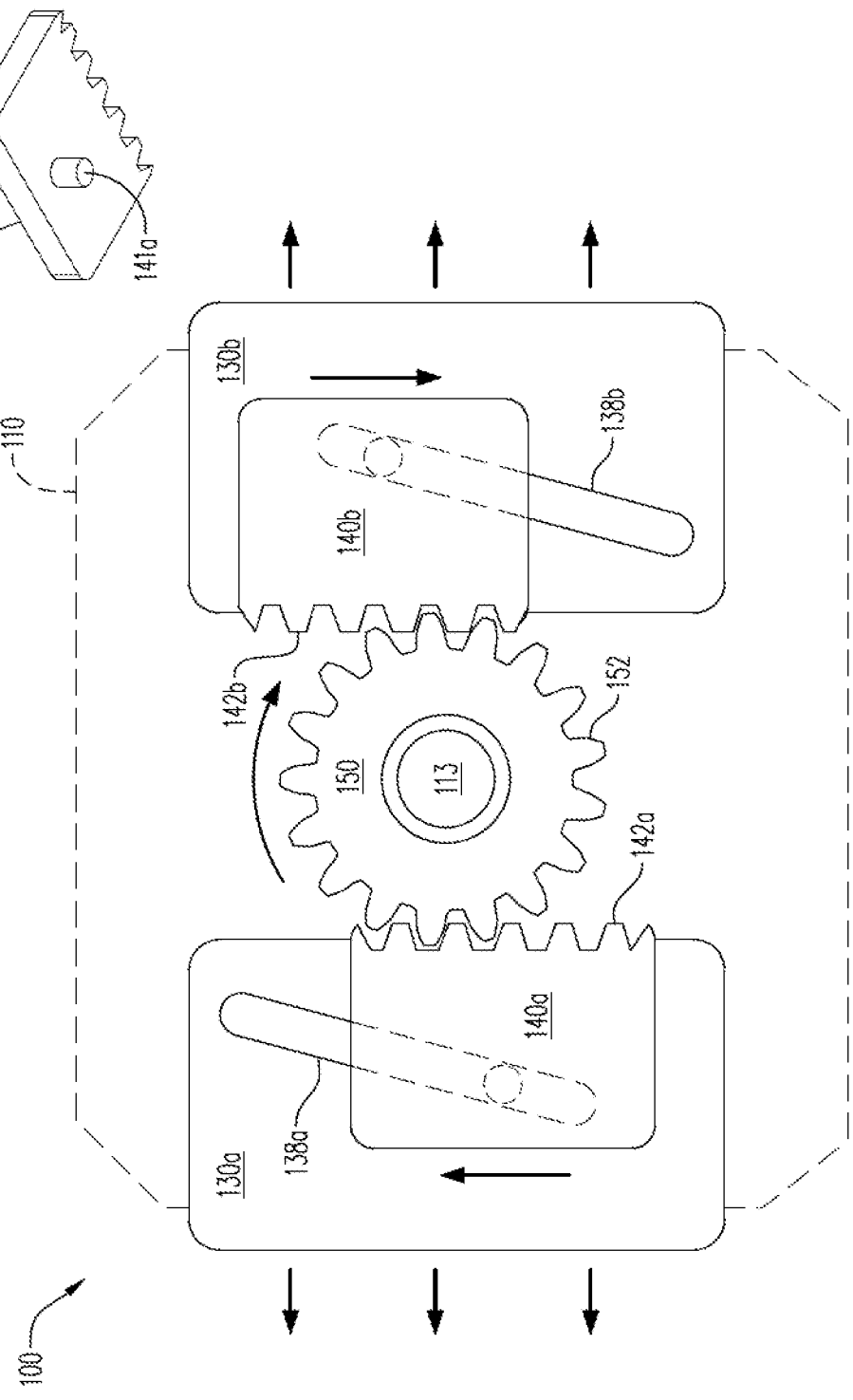

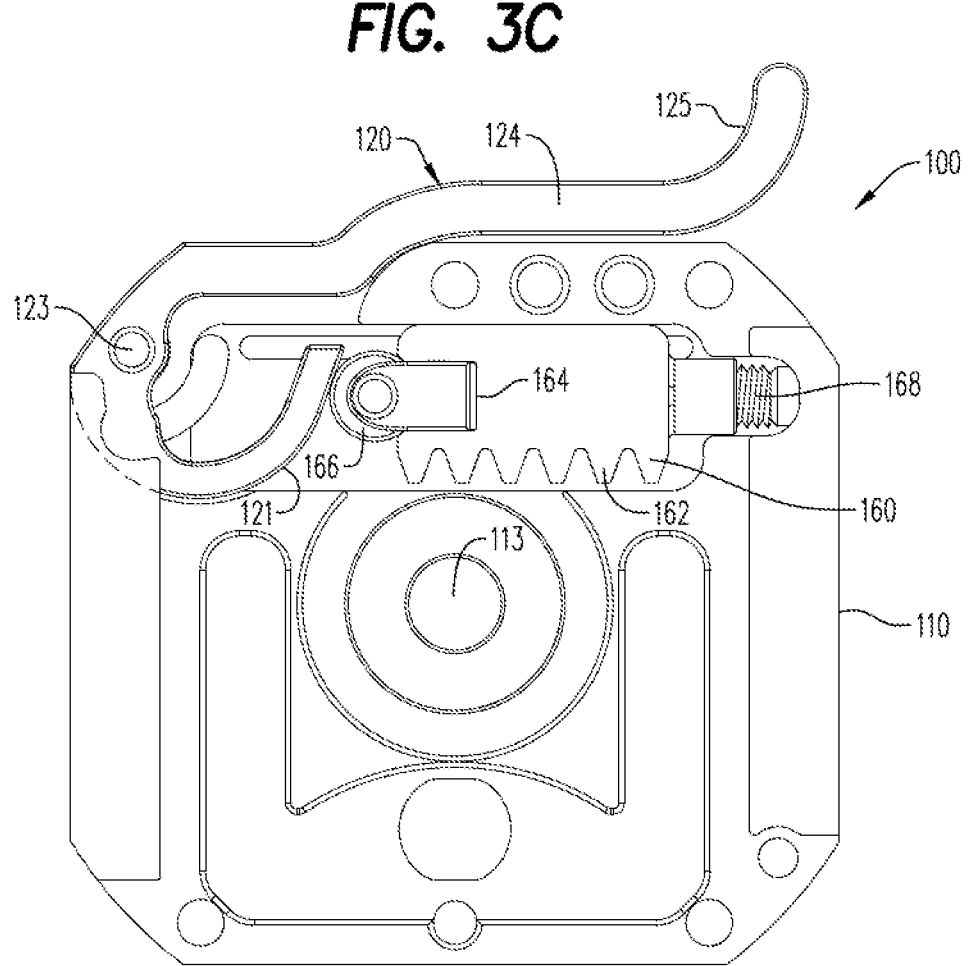

SELF-ADJUSTING CLAMP

CROSS-REFERENCE TO RELATED APPLICATIONS

The application claims the benefit of U.S. Provisional Application No. 63/239,511, filed on Sep. 1, 2021, in the US Patent and Trademark Office, the entire disclosure of which is hereby incorporated by reference for all purposes.

BACKGROUND

A dovetail rail or dovetail mount refers to sliding rail system that can be used for mounting firearms, sights, accessories, and the like, to a mounting bracket, often referred to as a plate. The mounting bracket may include a mechanism for attachment to a tripod such as a rifle-based tripod or a camera tripod. Examples of the different dovetail rail systems include a MIL-STD-1913 Picatinny rail, a North American Treaty Organization (NATO) Accessory rail, a Weaver rail, an ARCA SWISS® rail, and the like. The Picatinny rail, Weaver rail, and the NATO Accessory rail are similar in size. In particular, the Weaver rails has the same outside dimensions as the Picatinny and NATO Accessory rails. Meanwhile, the ARCA SWISS rail is significantly larger than the Picatinny rail and the NATO accessory rail.

Recently, there have been efforts to manufacture mounting brackets capable of holding multiple types of rails. However, one of the drawbacks of these related systems is that they require a bolt/screw that runs in between the sliding jaws which hold the rail in place. This prevents these clamps from holding onto a NATO Accessory rail which must rest flat against the surface of the mounting platform. Another issue with related mounting systems is that they require spring washers to be added to the bolt/screw in order to enable the mounting platform to hold onto different-sized rails when they do not fit perfectly within the jaws. However, this process creates a loose fit around the rail leaving the item being held to wobble and generally be unsteady.

SUMMARY

The example embodiments are directed to a clamp systems that can be used as a mounting platform for different types of rails. The clamp system may include a lever, such as a cam lever, that interacts with a scroll gear assembly built into a base of the clamp and without the need for a bolt/screw running through the top of the base plate. Furthermore, the lever may be compressible thereby providing a spring force that can enable the jaws of the clamp to self-adjust to different-sized rails while still holding the different-sized rails snugly. For example, when the lever is compressed and then released, elastic force may return the compressible cam lever back to its original position creating a spring force that pushes outward from the compressible cam lever.

The clamp system may include multiple jaws including a larger set of jaws capable of clamping onto larger-sized rails, such as ARCA SWISS® type rails, and a smaller set of jaws capable of clamping onto smaller-sized rails such as Picatinny and NATO Accessory rails. Another feature that is available is the use of a dual-sided lug that protrudes from a top surface of a base of the clamp. When protruding, the lug can be used to hold onto a Picatinny rail. When flipped over, the lug is flat with the rest of the base of the clamp enabling the smaller jaws to clamp onto a NATO Accessory rail or a Weaver rail that does not have an opening for the lug.

According to an aspect of an example embodiment, provided is a clamp apparatus that may include one or more of a lever in contact with a slidable lever rack, first and second jaw racks attached to first and second jaw plates, respectively, and a scroll gear that contacts the slidable lever rack and the first and second jaw racks, wherein, when the lever is turned, the slidable lever rack may drive the scroll gear which drives the first and second jaw racks to slide in opposite directions thereby causing the first and second jaw plates to move toward and/or away from each other.

According to an aspect of another example embodiment, provided is a clamp apparatus that may include one or more of a lever, first and second jaw plates with opposing jaws, and a scroll gear assembly that includes a first rack in contact with the lever, a second rack in contact with the first jaw plate, a third rack in contact with the second jaw plate, and a scroll gear in contact with the first, second, and third racks, wherein, when the lever is turned, the scroll gear assembly may drive the slidable jaw plates in opposite directions thereby causing the opposing jaws to move toward and/or away from each other.

According to an aspect of another example embodiment, provided is an apparatus that may include a compressible cam lever that comprises a handle, a round-shaped section comprising a curved surface that curves back towards the handle, and an opening disposed at an end of the curved surface, a slidable rack that includes a wheel attached to an end thereof which contacts the curved surface of the round-shaped section of the compressible cam lever, and a scroll gear that contacts the slidable rack.

According to an aspect of another example embodiment, provided is a compressible cam lever that may include a handle, a round-shaped section comprising a flexible curved surface that curves back towards the handle and protrudes outward, and an opening disposed between an end of the flexible curved surface and the handle.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1C is a diagram illustrating a side-perspective view of the clamp shown in FIGS. 1A and 1B, in accordance with example embodiments.

FIG. 1D is a diagram illustrating a detailed view of the grooves and edges of the jaw and the base in FIG. 1C, in accordance with an example embodiment.

FIG. 2A is a diagram illustrating an underneath view of two jaw plates of the clamp in accordance with an example embodiment.

FIG. 2B is a diagram illustrating an underneath view of a scroll gear assembly attached to the two jaw plates, in accordance with an example embodiment.

FIG. 2D is a diagram illustrating a protrusion extending from a top of a jaw rack in accordance with an example embodiment.

FIG. 3C is a diagram illustrating the cam lever and an additional rack of the scroll gear assembly in accordance with an example embodiment.

Figure 1A:
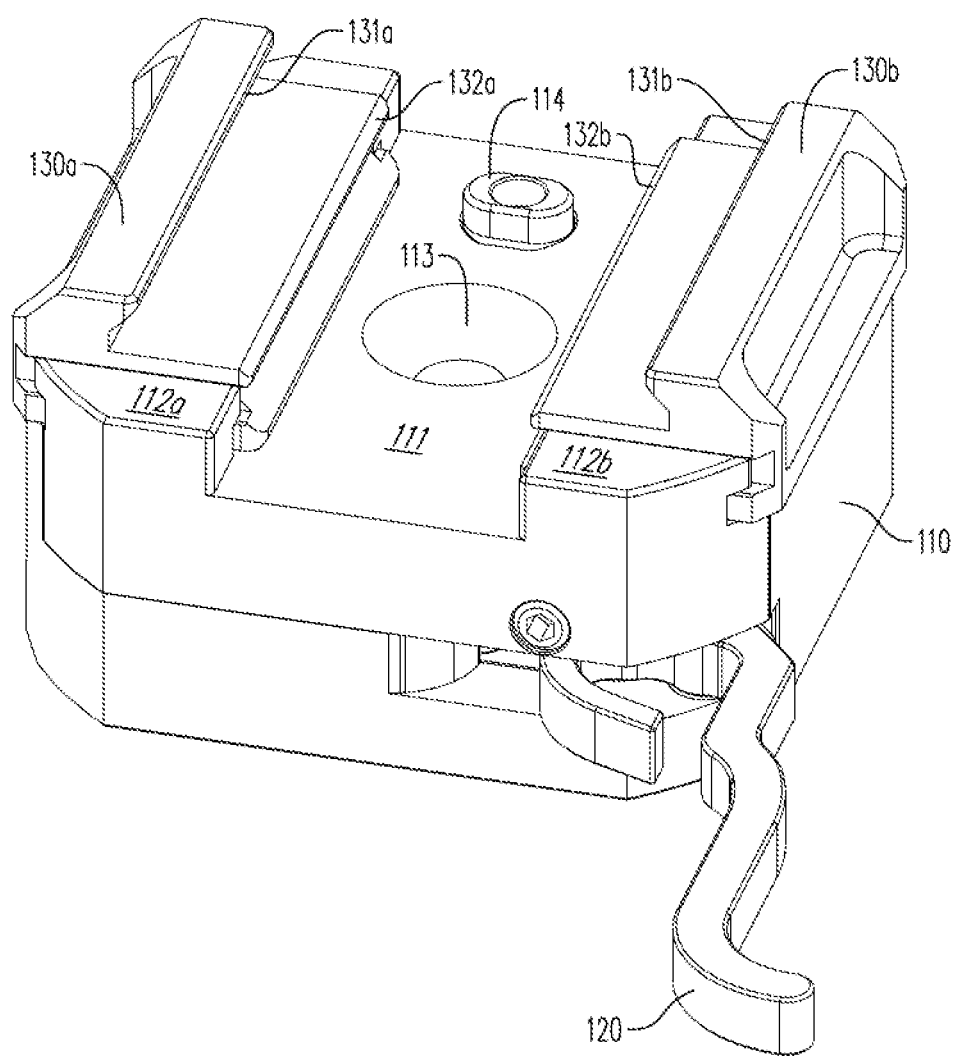
FIG. 1A is a diagram illustrating a clamp in an open position in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a self-adjusting clamp that has clamping surfaces, also referred to as jaws, for multiple sized objects or dovetails. The main throw lever is a cam lever which is flexible thereby providing a spring action which allows the mechanism to bend and self-adjust to a wide window of out-of-spec or multiple brands of dovetails. As an example, a 0.040 inch self-adjustment window may be provided but this can be changed with a larger lever or overall larger clamp body. In some embodiments, the clamp may include multiple sets of jaws including a first set of jaws for clamping onto a larger-sized rails such as an ARCA SWISS® type rail (e.g., approximately 38 mm or 1.5 inches wide). There is not an exact specification for the ARCA SWISS® type rail, so dimensions vary wildly between manufacturers. However, the self-adjusting characteristics of the clamp which are created by the spring action of the lever enables the jaws to securely clamp onto different-sized rails in a secure fashion. The clamp may also include a second set of jaws for clamping onto smaller-sized rails such as Picatinny and NATO Accessory rails (e.g., approximately 21 mm or 0.835 inches).

The lever makes contact with a lever gear plate that has a length adjusting roller piston. This allows the user or manufacturer the capability to adjust the clamping window. Turning a rear screw will add or reduce clamping force by adjusting the length of the roller piston. This can be done while the clamp is fully assembled. The roller reduces friction between the curved end of the lever and the gear plate and thereby extends the life of the clamp and makes the lever easier to manipulate.

The lever gear plate makes contact with a circular center gear, also referred to herein as a scroll gear. The center gear is further in contact and controls two mirrored spring loaded gears which are timed to move in equal distances to each other. The springs force from the lever forces the jaws to spring open when the throw lever swings open. The top portion of these two gears has a scroll gear pattern. The scroll gear pattern (i.e., a diagonal pattern) which makes contact with the jaw plates that hold the exterior clamping jaws. The clamping jaws are self-centering making equal parts contact when clamping onto a part/dovetail. They open in/out similar to a vise.

The top surface of the clamp has a small reversible stop-block that may be implemented in the form of a reversible lug. If a user is using the clamp to hold a Picatinny rail, the block can act as a retention lug. Here, the lug protrudes outward and can fit into a hole of the Picatinny rail thereby providing extra hold when the Picatinny rail is placed onto the top surface of the clamp. The user can flip the stop-block if the lug is not needed. In this example, the other side of the lug may include a smooth/flat surface that is flush with a top surface of the base of the clamp on which the jaw plates slide. Therefore, if the user is using a NATO Accessory rail which has no female lug slots, the NATO Accessory rail can fit flatly against a bottom of the top surface of the base of the clamp. Related clamping mechanisms use a bolt that runs in between the jaws thereby preventing a smooth/flat surface on a top surface of the mounting platforms thereof and likewise preventing the mounting platform from clamping onto a NATO Accessory rail.

According to various embodiments, the clamp may be mounted onto tripod ball heads or tripods which have their own methods of movement. There is also a possibility to use the clamp for work holding in the CNC machining industry. For example, the clamp could be used as a self-centering vise for holding manufacturing parts.

In some embodiments, the main throw lever, also known as a cam lever, is made out of steel and is a letter J shape including a handle portion on one end and a elliptical-shaped portion on the other end. However, the elliptical-shaped portion is not a complete ellipse/circle but instead includes a gap or an opening between an edge of the curved portion and the handle of the lever. This is helpful because it gives flex. The plate being held by the jaws can be too big or too small, and the cam lever can self-adjust to hold the plate tight because of the flex provided by the cam lever. The base of the clamp may include a hole in the middle which can be used to attach the clamp to the tripod or other equipment. At all times, the jaws stay an equal amount of distance away from the center of the clamp.

FIG. 1A illustrates a clamp 100 in an open position in accordance with an example embodiment. Referring to FIG. 1A, the clamp 100 includes a base 110 or housing and a cam lever 120 that is attached to the base (e.g., by a screw, bolt, nut, etc.) that is not shown. The clamp 100 also includes opposing jaw plates 130a and 130b with two pairs of jaws therein including a first pair of jaws 131a and 131b for clamping onto larger rails, such as an ARCA SWISS® type rail, and a second pair of jaws 132a and 132b for clamping onto smaller rails such as Picatinny rails and NATO Accessory rails. In some embodiments, the individual jaws 131*a*, 132*a*, 131*b*, and 132*b*, may include tongues that protrude outward thereof to create a better hold on the rail/part that is being clamped onto.

In FIG. 1A, the cam lever 120 is in the open position. In the open position, the jaw plates 130*a* and 130*b* are far enough apart that the first pair of jaws 131*a* and 131*b* and the second pair of jaws 132*a* and 132*b* are unable to clamp onto the rails. Therefore, the rails can be removed or taken out of the corresponding clamp 100.

The base 110 also includes a top surface 111 that includes a hole 113 in a center thereof that enables the clamp 100 to be attached to a tripod ball head. The jaw plates 130*a* and 130*b* remain equi-distant from the hole 113 and the center of the top surface 111 of the clamp 100 at all times. The base 110 also includes raised surfaces 112*a* and 112*b* which are designed to mate with grooves located on each side of the respective jaw plates 130*a* and 130*b* thereby securely holding onto the jaw plates 130*a* and 130*b* in a lateral direction with respect to each other and thus preventing the jaw plates 130*a* and 130*b* from moving any other direction other than towards or away from each other. The top surface 111 of the base 110 also includes a reversible lug 114 which in the example of FIG. 1A is protruding outward from the top surface 111 of the base 110 enabling the reversible lug 114 to attach to an opening within a Picatinny rail. Although not shown, the reversible lug 114 may be pulled out by hand and flipped over onto its other side which may be a flat surface that sits flush with the rest of the top surface 111 when pushed back in.

Figure 1B:
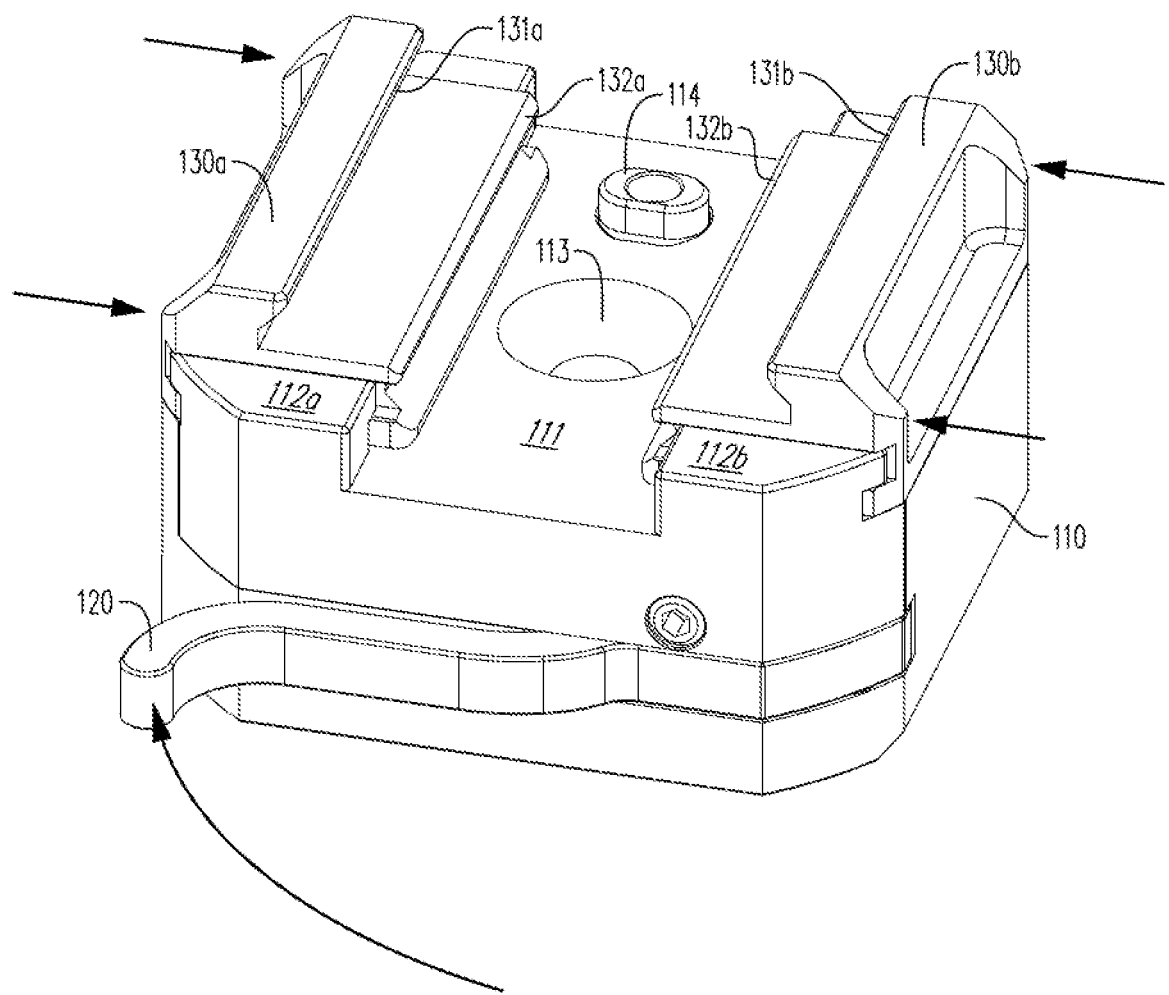
FIG. 1B is a diagram illustrating the clamp of FIG. 1A in a closed position in accordance with an example embodiment.

FIG. 1B illustrates the clamp 100 of FIG. 1A in a closed position in accordance with an example embodiment. Referring to FIG. 1B, a user has moved the lever 120 toward the base 110 causing the jaw plates 130*a* and 130*b*, and the corresponding pairs of jaws 131*a* and 131*b* and 132*a* and 132*b* to move towards each other in a clamping manner as indicated by the arrows. The user is free to move the lever 120 back and forth between the open and the closed positions without much friction from the remaining components of the clamp 100 as are further described in the examples of FIGS. 2A-2C and 3A-3D.

FIG. 1C illustrates a side-perspective view of the clamp 100 shown in FIGS. 1A and 1B, in accordance with example embodiments. Referring to FIG. 1C, a single jaw plate 130 is shown but it should be appreciated that the jaw plate 130 is applicable to either jaw plate 130*a* and 130*b* in FIGS. 1A and 1B. As shown in FIG. 1C, the jaw plate 130 has a bottom surface 133 that slides along a top surface 111 of the base 110. The base 110 also includes a raised surface 112 that sites on both sides of the jaw plate 130. Furthermore, each lateral side of the jaw plate 130 has a series of grooves and edges that mate with corresponding grooves and edges of the base 110 enabling a secure lateral fit for the jaw plate 130 (i.e., preventing it from moving laterally with respect to the other jaw plate (not shown). Therefore, the jaw plates are only able to move toward and away from each other.

In particular, the base 110 includes a first edge 116 that protrudes outward in a lateral direction from about the top of the raised surface 112. The base also includes a recess 117 and a second edger 118 that protrudes outward even farther than the first edge 116. Meanwhile, the jaw plate 130 includes a first edge 134 that protrudes outward and rests on top of the raised surface 112 of the base. The jaw plate 130 also includes a second edge 136 and a recess 135 between the first edge 134 and the second edge 136. The jaw plate 130 also includes a second recess 137. Here, the recess 135, the second edge 136, and the second recess 137 mate with the first edge 116, the recess 117, and the second edge 118 of the base 110 of the clamp 100. This same arrangement may be formed on both sides of the jaw plate 130 thereby securing the jaw plate 130 from moving laterally.

As further described below and shown in the examples of FIGS. 2A-2C and 3A-3D, the base 110 of the clamp may house a gear assembly (e.g., a scroll gear assembly) which includes a plurality of racks or plates for interconnecting the lever 120 with the jaw plates 130*a* and 130*b*, without the need for a bolt/screw to be positioned between the jaw plates 130*a* and 130*b*.

FIG. 2A illustrates an underneath view of the two jaw plates 130*a* and 130*b* of the clamp 100 in accordance with an example embodiment. Referring to FIG. 2A, the jaw plates 130*a* and 130*b* include diagonal grooves 138*a* and 138*b*, respectively. The diagonal grooves 138*a* and 138*b* are in opposite diagonal directions to each other. The diagonal pattern enables force to be applied in one direction (i.e., up or down in the example of FIG. 2A), causing the jaw plates 130*a* and 130*b* to move in a perpendicular direction (i.e., left or right in the example of FIG. 2A), because the jaw plates 130*a* and 130*b* are held in place laterally by the grooves and edges of the base 110 as shown in FIG. 1C.

FIG. 2B illustrates an underneath view of a scroll gear assembly attached to the two jaw plates 130*a* and 130*b*, in accordance with an example embodiment. Referring to FIG. 2B, two jaw racks 140*a* and 140*b* have been attached to or otherwise integrated with the two jaw plates 130*a* and 130*b*, respectively. The jaw racks 140*a* and 140*b* include a toothed edge 142*a* and 142*b* on one side, respectively. Furthermore, a center gear 150 may be attached to the hole 113 in the center of the base 110. The center gear 150 (also referred to as a scroll gear) may turn clockwise and counterclockwise depending on a force applied from the lever 120, as further shown and described with respect to FIGS. 3C and 3D.

Like the jaw racks 140*a* and 140*b*, the center gear 150 includes teeth 152 that surround the outer edge of the center gear 150 enabling the center gear 150 to contact the teeth of the jaw racks 140*a* and 140*b* and turn the jaw racks 140*a* and 140*b* which are attached to the jaw plates 130*a* and 130*b*, respectively. In particular, the jaw racks 140*a* and 140*b* may include a protrusion 141*a* on a top thereof as shown in the bottom left corner of FIG. 2B. The protrusion 141*a* may fit into a diagonal groove (e.g., diagonal groove 138*a*, etc.) of the jaw plate 130*a*. Although not shown in FIG. 2B, it should be appreciated that the jaw rack 140*b* may include a similar protrusion sticking up from its top surface and enabling the jaw rack 140*b* to fit into the diagonal groove 138*b* of the jaw plate 130*b* shown.

In operation, the center gear 150 turns in a clockwise direction causing the jaw racks 140*a* and 140*b* to move in opposite directions with respect to each other. In particular, the jaw rack 140*b* moves downward while attached within the diagonal groove 138*b* of the jaw plate 130*b*. Here, the jaw plate 130*b* is held in place laterally as shown in FIG. 1C. Therefore, the jaw plate 130*b* moves outward only as a result of the jaw rack 140*b* moving downward as shown in FIG. 2B. Likewise, the jaw rack 140*a* moves upward while attached within the diagonal groove 138*a* of the jaw plate 130*a*. Here, the jaw plate 130 is also held in place laterally as shown in FIG. 1C, thereby preventing the jaw plate 130*a* from moving in a lateral direction. Instead, the jaw plate 130*a* moves outward as a result of the jaw rack 140*a* moving upward as shown in FIG. 2B. Thus, the two jaw plates 130*a* and 130*b* move in opposite directions with respect to each other, when the center gear 150 is turned in a clockwise direction. This essentially releases the jaws of the clamp 100 as shown in FIG. 1A.

Figure 2C:
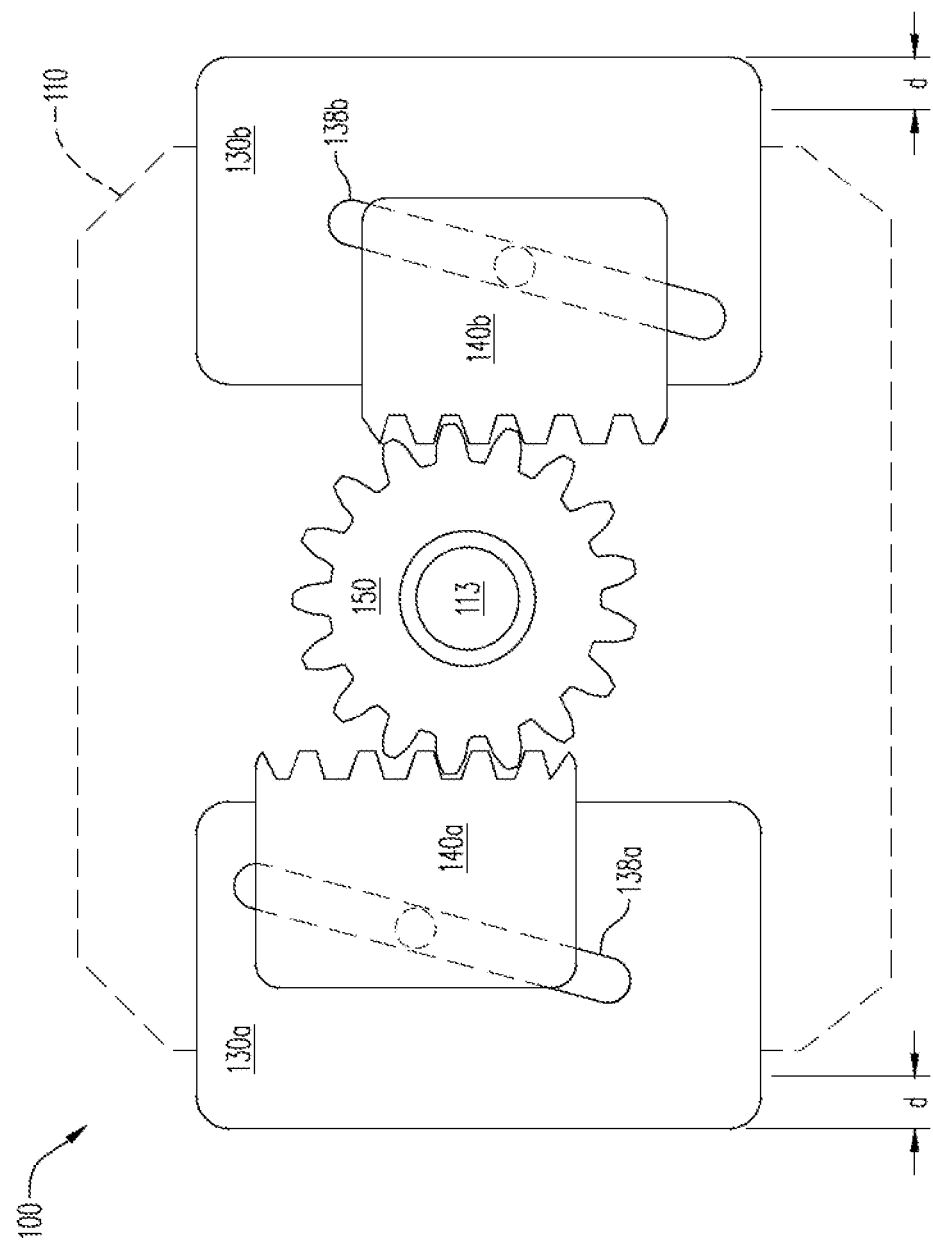
FIG. 2C is a diagram illustrating movement of the scroll gear assembly and the two jaw plates of FIG. 2B, in accordance with an example embodiment.

FIG. 2C illustrates a result of the movement of the scroll gear assembly performed in FIG. 2B, causing the two jaw plates 130a and 130b to move an equal distance (d) away from each other and away from the hole 113 in the center of the clamp, in accordance with an example embodiment. The amount of distance (d) that the jaw plates 130a and 130b move with respect to each other can be modified by using larger parts or larger diagonal angles.

It should be appreciated that although not shown in the examples of FIGS. 2A-2C, if the center gear 150 were to be driven in a counterclockwise direction, the operation would work in reverse causing the jaw racks 140a and 140b to be turned in opposite directions by the center gear 150 thereby causing the jaw plates 130a and 130b to move in opposite directions (i.e., towards each other). Therefore, the jaws of the clamp 100, which are positioned on the other side (not shown) of the jaw plates 130a and 130b, may close/clamp onto a rail or a part via such operation.

As further shown and described with respect to FIGS. 3A-3D, the scroll gear assembly according to various embodiments includes a third rack, also referred to herein as a lever rack that provides an interconnection between the cam lever 120 and the center gear 150 thereby enabling the cam lever 120 to be thrown by a user and drive the center gear 150 in either a clockwise (opening the clamp) direction or a counterclockwise (closing the clamp) direction.

Figure 3A:
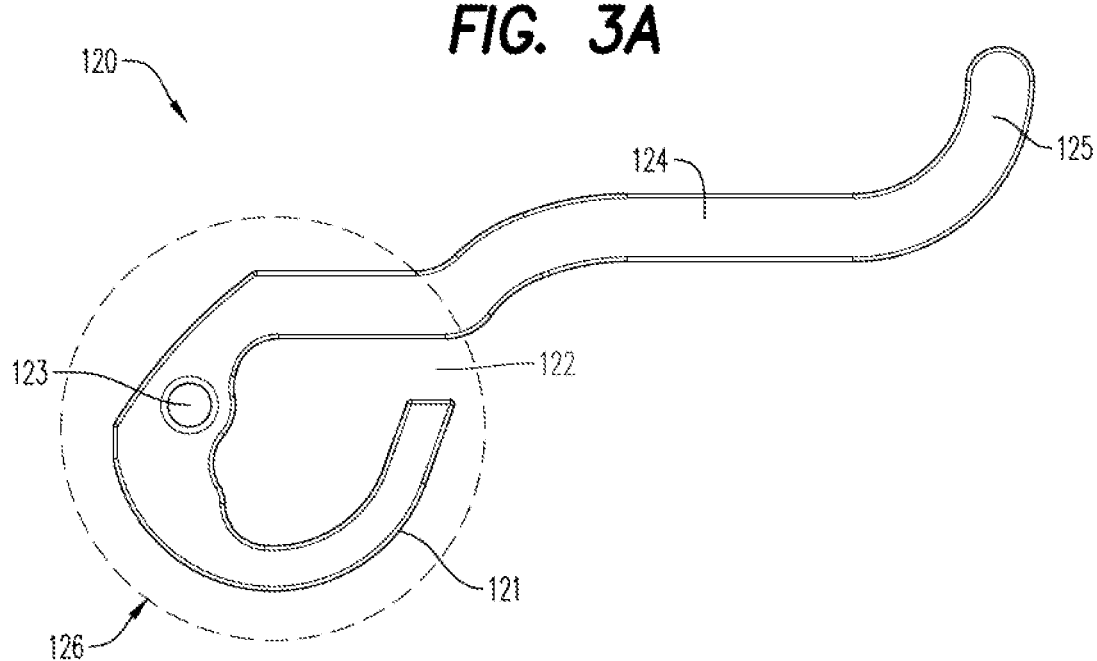
FIGS. 3A and 3B are diagrams illustrating examples of a cam lever in accordance with example embodiments.
Figure 3B:
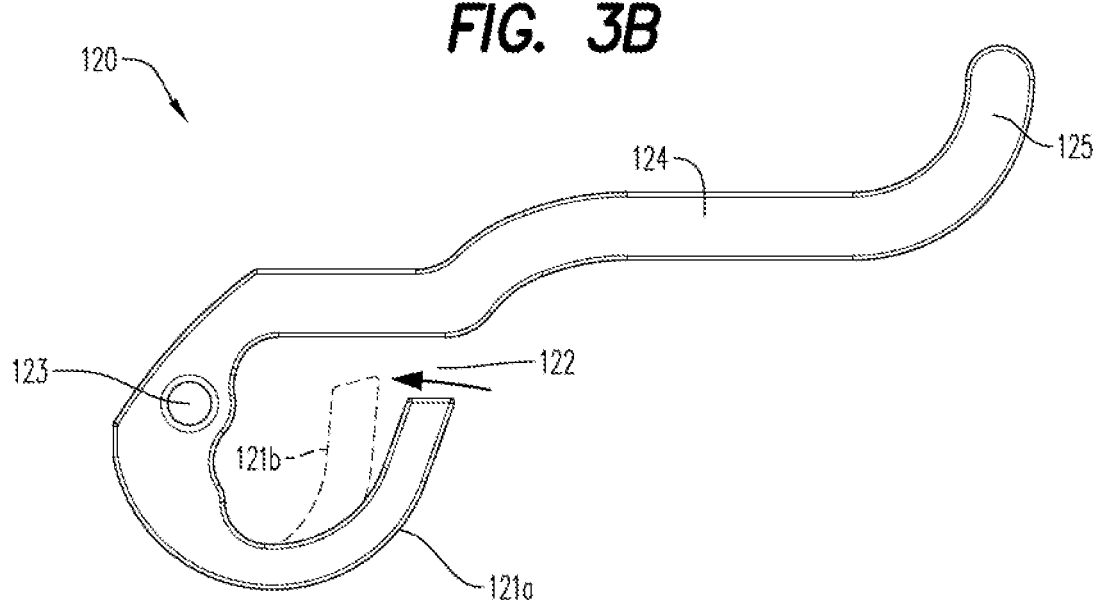

FIGS. 3A and 3B illustrate examples of the cam lever 120 in accordance with example embodiments. In the example embodiments, the cam lever 120 may be referred to as a compressible lever because the design of the cam lever 120, specifically the unclosed elliptical or circular shaped section at the end of the cam lever 120 provides a spring force. Thus, the cam lever 120 itself can compress (i.e., bend) to accommodate for parts or rails held by the jaws of the clamp that are not perfectly the same size. In some embodiments, the cam lever 120 may be of uniform construction and may be comprised of steel or another metallic material. It should also be appreciated that the cam lever 120 may be composed of other materials such as ceramic, wood, plastic, or the like.

Referring to FIG. 3A, the cam lever 120 includes a handle tip 125, a handle 124, and a rounded section 126 (also referred to as an elliptical-shaped or circular-shaped section). The rounded section 126 includes a round shape, such as an elliptical shape or a circular shape that includes a curved section 121 that bends back towards the handle 124 at an intermediate portion/position of the handle 124. The round section 126 is not a complete circle or ellipse, but instead is incomplete because an opening 122 is designed at an end of the curved section 121 that allows the end of the curved section 121 to move freely in a lateral direction creating a spring force. For example, as shown in FIG. 3B, the curved section may be at an initial position 121a and may move back and forth between a bent position 121b and the initial position 121a based on force applied to the outer surface thereof. As further described with respect to FIG. 3C, the cam lever 120 may include a hole 123 for receiving a bolt or screw to attach the cam lever 120 to the base 110 of the clamp 100 described herein.

As further shown in FIGS. 3A and 3B, the cam lever 120 is a self-compressing lever because the tip end of the curved section 121 is able to move back and forth. When compressed into the bent position 121b, the curved section 121 holds a force therein. When the force being applied to the curved section 121 is released while the curved section 121 is in bent position 121b, elastic force within the cam lever 120 (and the curved section, etc.) causes the curved section 121 to spring back from the bent position 121b and return to its initial position 121a. As will be appreciated, if a part/rail is being held by the jaws of the clamp 100, the part/rail will not need to fit perfectly into the jaws because of the extra "play" provided by the spring force of the cam lever 120. During initial testing, the cam lever 120 provided an additional 0.04 inches of play or "self-adjustment", but this could be increased or decreased by increasing or decreasing a size of the parts that are used to construct the clamp 100.

FIG. 3C illustrates the cam lever 120 and a cam lever rack 160 of the scroll gear assembly in accordance with an example embodiment. Referring to FIG. 3C, the cam lever rack 160 is similar to the jaw racks 140a and 140b shown in FIGS. 2B and 2C. Here, the cam lever rack 160 includes a toothed edge 162 that contacts the toothed edge of the center gear 150. The cam lever rack 160 also includes an attachment 164 that is integrated with the cam lever rack 160 and which holds a roller piston 166 on an exterior side of the cam lever rack 160. The roller piston 166 is a wheel shape and made of steel, aluminum, brass, or other composite material. The roller piston 166 can roll along the curved section 121 (i.e., the curved surface of the curved section 121) of the cam lever 120. The roller piston 166 prevents the curved section 121 of the cam lever 120, which is metal, from contacting the cam lever rack 160, which is also metal, thereby improving the durability and life of the parts of the clamp 100. The cam lever rack 160 also includes a threaded element that is referred to herein as a stopper 168 integrated therein that works as a stopper when the cam lever rack 160 is pushed to the right.

In operation, the cam lever rack 160 slides left and right. In particular, the closing of the cam lever 120 (i.e., pushing it towards the base 110), pushes the curved section 121 downward causing the roller piston 166 to turn in a clockwise direction and move toward the right and push against the rest of the cam lever rack 160 thereby causing the cam lever rack 160 to move slightly in a horizontal direction toward the right. However, the stopper 168 prevents restricts the movement of the cam lever rack 160 to just a small distance. This motion likewise causes the curved section 121 to bend as shown in FIG. 3B.

When the handle 124 of the cam lever 120 is pulled up, the curved section 121 of the cam lever 120 also moves upward. This action cause the roller piston 166 to roll in a counterclockwise direction and also move a small distance in the opposite horizontal direction (i.e., towards the left) thereby sliding the cam lever rack 160 in the opposite horizontal direction. Although not shown in FIG. 3C, there is an opening that allows the curved section 121 of the cam lever 120 to exit the base 110 during such operation. Here, a spring force may push the roller piston 166 to roll along the curved section 121 of the cam lever 120 creating a releasing force which pushes the cam lever rack 160 back to the left. For example, one or more springs may be positioned on the right side of the cam lever rack 160 that pushes the cam lever rack 160 and the roller piston 166 attached thereto back towards the cam lever 120 when the cam lever 120 is opened. As another example, one or more springs 310 may be positioned above the jaw rack 140a and one or more springs 320 may be positioned below the jaw rack 140b causing the jaw rack 140a to push downward and the jaw rack 140b to push upward when the cam lever 120 is opened thus causing the center gear 150 to turn counter-clockwise and push the cam lever rack 160 and the roller piston 166 attached thereto back towards the cam lever 120. Other implementations are also possible.

Figure 3D:
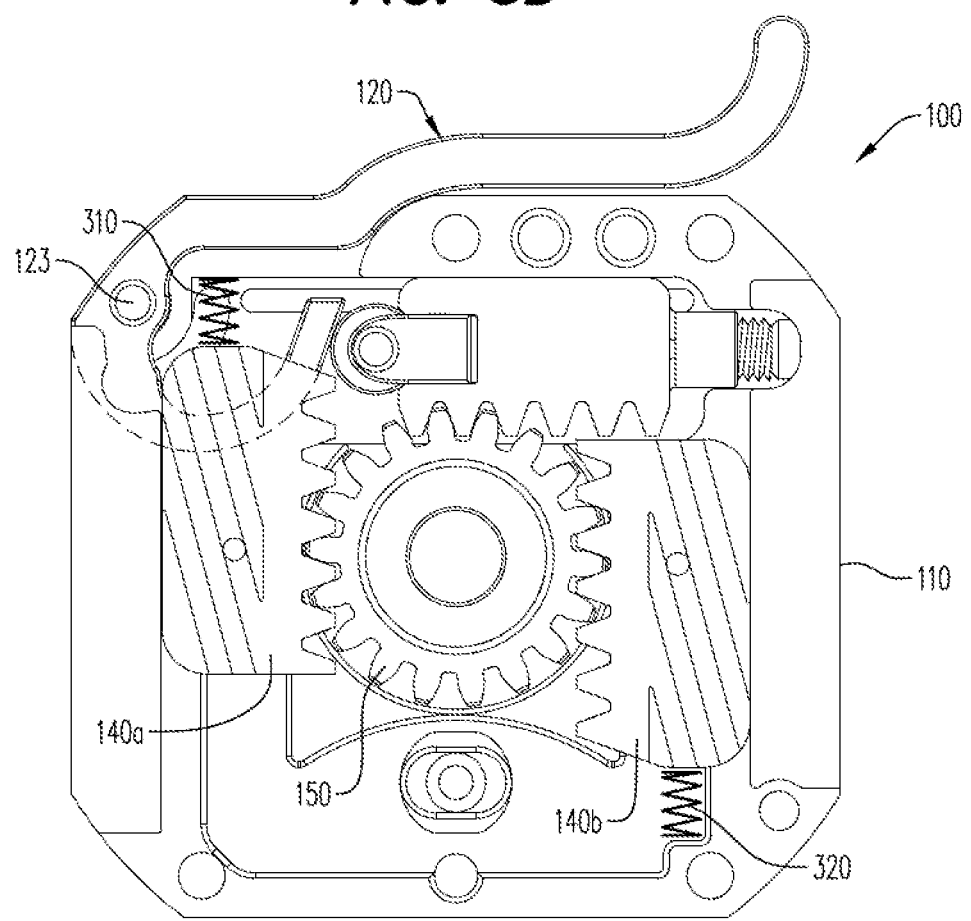
FIG. 3D is a diagram illustrating the cam lever and the fully assembled scroll gear assembly of the clamp in accordance with an example embodiment.

FIG. 3D illustrates the cam lever 120 and the scroll gear assembly of the clamp 100 in accordance with an example embodiment. Referring to FIG. 3D, the fully-assembled scroll gear assembly includes the center gear 150, the jaw racks 140a and 140b, and the cam lever rack 160. When the cam lever 120 is pulled upward and away from the base 110 of the clamp, the cam lever rack 160 will move towards the left driving the center gear 150 to move counterclockwise. This action causes the center gear 150 to cause the jaw plate 140b to slide upward and the jaw plate 140a to slide downward. When the jaw plate 140b slides upward and the jaw plate 140a slides downward, this causes the jaws on the opposing sides to move outward and away from the center hole 113 of the clamp thereby releasing anything that is being held by either sets of jaws.

Likewise, when the cam lever 120 and pushed downward towards the base 110 of the clamp 100, the cam lever rack 160 will move toward the right in a restricted manner due to the stopper 168. This movement causes the cam lever rack 160 to drive the center gear 150 in a clockwise direction, which likewise causes the jaw rack 140b to move downward and the jaw rack 140a to move upward. When the jaw plate 140b slides downward and the jaw plate 140a slides upward, this causes the jaws on the opposing sides to move inward toward each other and inward toward the center hole 113 of the clamp thereby clamping onto anything that approximately fits in either set of jaws.

Figure 4:
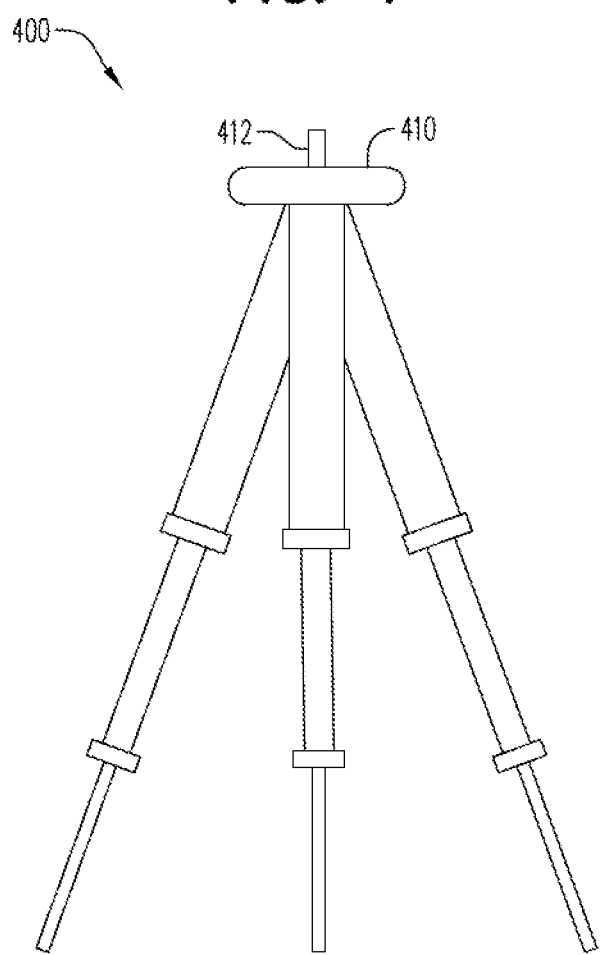
FIG. 4 is a diagram illustrating a tripod on which the clamp may be mounted in accordance with an example embodiment.

FIG. 4 illustrates a tripod apparatus 400 after a plurality of tripod legs have been extended in accordance with an example embodiment. The tripod apparatus 400 may include three legs, and may include a support 410 for holding and elevating a piece of equipment such as a camera, a scope, a rifle, or the like. Each of the legs may be collapsible or otherwise retractable. The support 410 may include an attachment mechanism 412 that fits into the center hole 113 of the clamp 100 shown and described herein. Thus, the clamp 100 can be attached to the tripod 400 shown in FIG. 4. Furthermore, when attached to the tripod 400, the clamp 100 can be used to secure a firearm, a sight, a scope, a part, a piece, or the like, there within.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A clamp apparatus, comprising: a lever comprising a handle and a round body with an outer surface which is in contact with a slidable lever rack; first and second jaw racks attached to first and second jaw plates, respectively; and a scroll gear that contacts the slidable lever rack and the first and second jaw racks, wherein, when the handle of the lever is swung, the outer surface of the round body of the lever contacts the slidable lever rack that moves the scroll gear which drives the first and second jaw racks to slide in opposite directions causing the first and second jaw plates to move toward and/or away from each other.

2. The clamp apparatus of claim 1, wherein the first jaw plate comprises a first diagonal groove embedded in an underside of the first jaw plate and the second jaw plate comprises a second diagonal groove embedded in an underside of the second jaw plate that is in an opposite direction from the first diagonal groove.

3. The clamp apparatus of claim 2, wherein the first jaw rack comprises an attachment that slides within the first diagonal groove of the first jaw plate, and the second jaw rack comprises an attachment that slides within the second diagonal groove of the second jaw plate.

4. The clamp apparatus of claim 1, wherein the lever comprises a cam lever that contacts a roller attached to the slidable lever rack.

5. The clamp apparatus of claim 4, wherein the cam lever comprises a J shape with an opening at an end of the lever.

6. The clamp apparatus of claim 4, wherein the cam lever comprises a flexible end that bends when external pressure is applied.

7. The clamp apparatus of claim 1, wherein the first jaw plate comprises an opposing jaw and the second jaw plate comprises a corresponding opposing jaw, respectively, for clamping a plate with rails that are more than 35 mm apart.

8. The clamp apparatus of claim 7, wherein the first jaw plate comprises a second opposing jaw and the second jaw comprises a corresponding second opposing jaw, for clamping a plate with rails that are less than 25 mm apart.

9. The clamp apparatus of claim 1, further comprising a base that includes a top surface, and wherein bottom surfaces of the first and second jaw plates slide along the top surface of the base of the clamp apparatus.

10. The clamp apparatus of claim 9, wherein the base further comprises a two-sided lug that is attached to the top surface of the base.

11. The clamp apparatus of claim 10, wherein the two-sided lug protrudes outward from the top surface of the base.

12. The clamp apparatus of claim 1, wherein when the scroll gear turns it causes the first and second jaw racks to slide in opposite directions.

* * * * *